United States Patent
Chmara et al.

(10) Patent No.: US 7,995,727 B1
(45) Date of Patent: Aug. 9, 2011

(54) METHOD AND APPARATUS FOR CONTROLLING CALLING-PARTY IDENTIFICATION

(75) Inventors: Thomas P. Chmara, Richmond (CA); Raymond Bruce Wallace, Ashton (CA)

(73) Assignee: Nortel Networks Limited, St. Laurent (CA)

( * ) Notice: Subject to any disclaimer, the term of this patent is extended or adjusted under 35 U.S.C. 154(b) by 1162 days.

(21) Appl. No.: 11/379,595

(22) Filed: Apr. 21, 2006

(51) Int. Cl.
*H04M 1/56* (2006.01)
*H04M 15/00* (2006.01)

(52) U.S. Cl. ......... 379/142.09; 379/142.05; 379/142.17; 370/352

(58) Field of Classification Search ............... 379/93.17, 379/93.23, 142.01, 142.04, 142.06, 142.09, 379/142.17, 245, 142.05; 370/352–400
See application file for complete search history.

(56) References Cited

U.S. PATENT DOCUMENTS

| | | | | |
|---|---|---|---|---|
| 5,274,699 A | * | 12/1993 | Ranz ........................ | 379/142.09 |
| 5,283,824 A | * | 2/1994 | Shaw ........................ | 379/142.09 |
| 5,548,636 A | | 8/1996 | Bannister et al. | |
| 5,864,612 A | * | 1/1999 | Strauss et al. ............ | 379/142.03 |
| 5,901,209 A | * | 5/1999 | Tannenbaum et al. ... | 379/142.09 |
| 6,324,271 B1 | | 11/2001 | Sawyer et al. | |
| 6,560,329 B1 | * | 5/2003 | Draginich et al. ........ | 379/265.02 |
| 6,584,505 B1 | | 6/2003 | Howard et al. | |
| 6,771,755 B1 | * | 8/2004 | Simpson ................... | 379/142.04 |
| 6,816,849 B1 | | 11/2004 | Halt, Jr. | |
| 7,020,255 B2 | * | 3/2006 | Gruchala et al. ......... | 379/142.02 |
| 7,280,647 B2 | * | 10/2007 | Henderson ................ | 379/142.01 |
| 7,551,731 B2 | * | 6/2009 | Durga et al. .............. | 379/142.09 |
| 2002/0181681 A1 | * | 12/2002 | Mani ......................... | 379/142.03 |
| 2006/0067308 A1 | * | 3/2006 | Cho ............................... | 370/352 |
| 2007/0064895 A1 | * | 3/2007 | Wong et al. ............... | 379/142.09 |
| 2007/0206735 A1 | * | 9/2007 | Silver et al. ................ | 379/88.19 |
| 2007/0211873 A1 | * | 9/2007 | Wang ........................ | 379/142.01 |

* cited by examiner

*Primary Examiner* — Binh K Tieu
(74) *Attorney, Agent, or Firm* — Louis B. Allard; Borden Ladner Gervais LLP

(57) ABSTRACT

The present invention provides a system, method, and apparatus for managing the calling-party identification information offered to called parties. Accordingly, a caller can designate the Caller ID information to the called party based on the context of the call (e.g. the role of the caller) rather than the terminal used. Typically the calling party does this by selecting which of multiple values they wish to have sent with the call request. It is beneficial to implement such a mechanism in a secure manner—the ability to employ a different calling-number or calling-name ID should be restricted to properly-authorized and authenticated persons—in order to ensure the quality of this information. Accordingly, preferred embodiments include an authentication mechanism for verifying the calling party information is authentic.

38 Claims, 3 Drawing Sheets

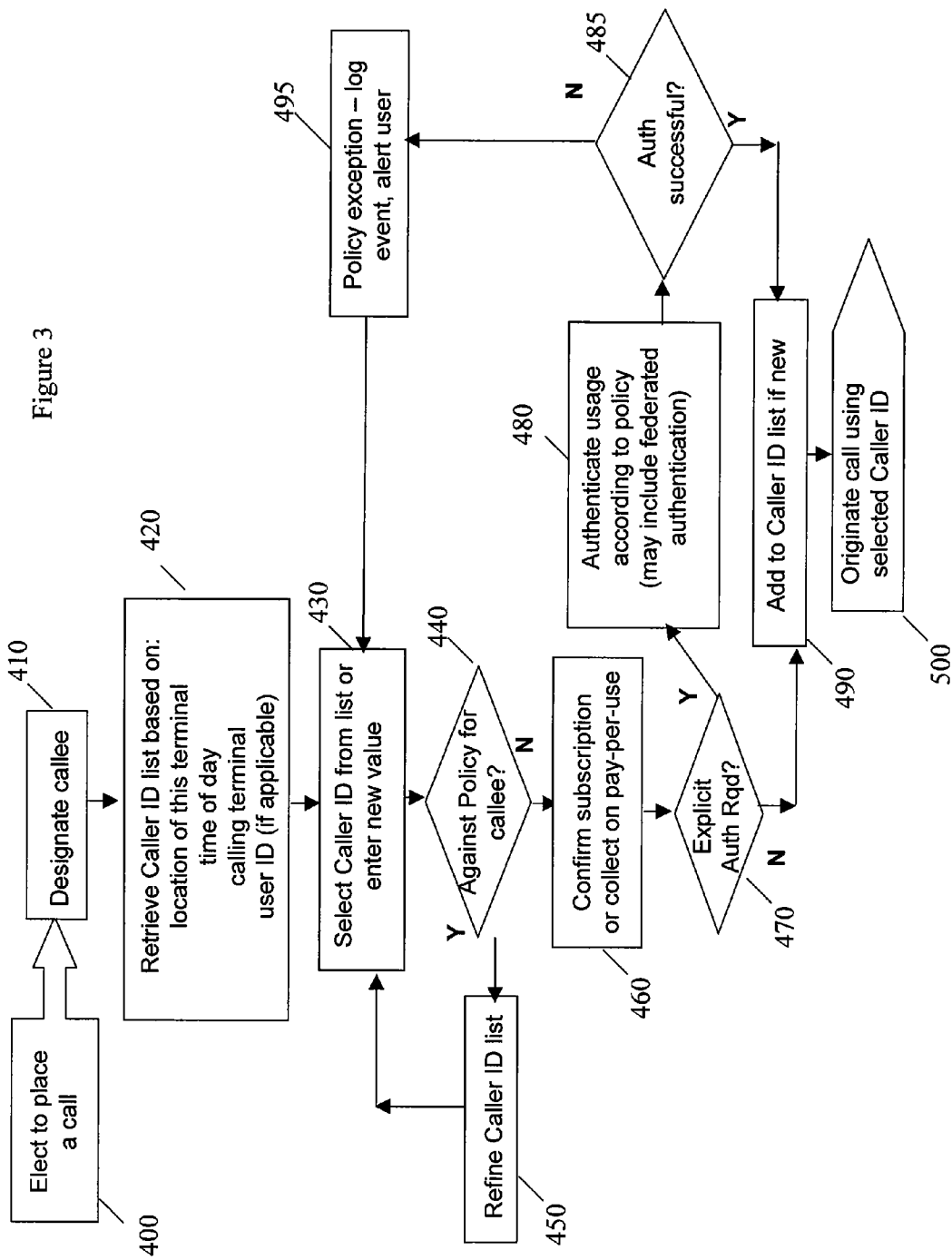

METHOD AND APPARATUS FOR
CONTROLLING CALLING-PARTY
IDENTIFICATION

CROSS REFERENCE TO RELATED
APPLICATIONS

This is the first application for this invention.

FIELD OF THE INVENTION

The present invention relates generally to telecommunication systems. More particularly, the present invention relates to systems which convey caller identification information (Caller ID).

BACKGROUND OF THE INVENTION

"Caller ID" subscription services offer perceived value in allowing called parties to identify callers and thereby make informed call-disposition decisions. In this specification, "Caller ID" means caller identification information and includes "Calling Number Identifier", "Calling Name Identification", and other variations used in the field.

Existing services are focused on the "receiving end"—on manipulating received calling-number and calling-name information, allowing automation of incoming-call disposition according to user and/or business policy. Disposition variables can include incoming Caller ID, time of day, current status (e.g. on the phone); service policy typically has a system default and can be tailored by the user.

The utility of these existing services relies on the accuracy and credibility of calling-name identification information. The recipient needs confidence that the calling-party's identification can be trusted. This is especially true for communications services where the end systems are not under regulatory control. A PSTN subscriber loop is relatively secure, and the calling-party identifier can generally be trusted; while it is possible to provide invalid calling-party identifiers, the problem is rare and the called party can have a high degree of confidence in the information. Consequently, current calling-number and calling-name ID information is tied to the registration (and sometimes, e.g. in the case of wire line services, to the physical location) of the caller's terminal device, which typically has one number associated with each subscriber loop.

Conversely, a poorly-managed, mis-configured, or maliciously-configured Voice over Internet Protocol (VoIP) system (e.g., one based on Session Initiation Protocol (SIP)) can offer relatively-arbitrary calling-party identification information.

Today's service providers derive large amounts of revenue from Caller ID services. Growth in remote and branch-office installations; and adoption of Voice over IP (VoIP), and other situations where the identity of the calling party may be obscured, threaten Caller ID accuracy and by extension that revenue stream.

One prior art system and method for authentication of caller identification is described in U.S. Pat. No. 6,324,271, issued Nov. 27, 2001 to Sawyer et al., and assigned to the assignee of the present application, which is hereby incorporated by reference. "Sawyer" is focused on authenticating the identity of a calling party regardless of the location or terminal the user is calling from—the same identity can be offered regardless of whether the user is dialing in from a payphone, from their residence, desk phone, or cell.

However, many people serve in multiple roles through the course of the day. One prior art Method and Apparatus for Providing User Controlled Call Management Services is described in U.S. Pat. No. 5,548,636, issued Aug. 20, 1996 to Bannister et al., and assigned to the assignee of the present application, which is hereby incorporated by reference. Bannister deals with call management services, which allows a called party to have calls routed to different terminals. Bannister recognizes that the Called party will have different roles, and will not necessarily know whether a re-routed call to the called party's cell phone was originally destined to the called party's office phone or home phone. Accordingly Bannister teaches a method and apparatus for advising the called party of the role to which a received call was originally directed.

These two inventions deal with, first, offering a unique calling identity regardless of the nature of the originating device; the second is focused on aiding the called party in managing incoming calls.

Reference is also made to US patent application by Steeves et. al., filed Jun. 20, 2001 with Ser. No. 09/884,346, entitled Method for Privacy and Personalization on IP Networks, and assigned to the assignee of the present application, which is hereby incorporated by reference. None of these references aid a caller in controlling the outgoing calling information to better represent the context of their call.

A person with multiple roles may want to make a call relating to one role in a spare moment snatched from another, or while at home. For example, consider a physician who runs a private practice, maintains a home office, has admitting privileges at a local hospital, and volunteers at a local HIV clinic. In the struggle to keep up, she catches up on her work in those various capacities whenever and wherever she can. However, placing a call from one location, but relating to a different capacity or function (hereafter "role"), can inadvertently provide misleading (and potentially private) information to the called party. Depending on what is displayed, the information delivered to the called party in the Caller ID field may have connotations which are inaccurate, potentially alarming, and may not offer appropriate privacy protection.

In addition to creating opportunities for misunderstanding and poor call-disposition decisions, the calling information may not be useful to the called party—if recorded by a Caller ID device or voicemail, as the called party may not have the correct information to properly return the call.

Many scenarios can be envisioned—for example, teachers calling parents to report students' performance concerns would prefer to leave the school's switchboard number than that of their own home telephone—and the school number is more useful to the concerned parent.

Conventional systems allow some measure of privacy protection by being able to suppress the Caller ID field. However, this typically results in a blocked number being presented to the caller, who may ignore the call in order to avoid telemarketers, which is problematic, especially for situations where voice messages are inappropriate.

A preferable scenario might be to leave the number of the hospital switchboard for a hospital patient; or the doctor's private practice number for the call about his patient's annual physical; or the school's number for a teacher.

SUMMARY OF THE INVENTION

It is, therefore, desirable to be able to provide Caller ID information which is attributed to the role (e.g., function) of the caller, rather than the device used by the caller. Thus the present invention provides a system, method, and apparatus for managing the calling-party identification information offered to called parties. Accordingly, a caller can designate the Caller ID to be conveyed to the called party based on the caller's preference and assessment of the context of the call. According to a preferred embodiment the calling party does this by selecting which of multiple values they wish to have sent with the call request.

In a first aspect, the present invention provides a method of providing caller identification information by a caller for a call comprising: a) Designating caller identification information (Caller ID) to be conveyed to said called party from a set of more than one possible Caller IDs; and b) conveying said Caller ID to said called party. According to an embodiment the call can be originated from a device controlled by a first administrative entity, whereas the designated Caller ID can be controlled by a second administrative entity. The designating step can comprise receiving a selection from a set of previously authorized Caller ID values. This set of previously authorized Caller ID values can represent multiple identities associated with the caller and/or the terminal.

It is also desirable in a number of scenarios for such a system to also facilitate ensuring legitimate use of this capability. This is complicated where the caller is using a device whose managing entity (e.g. a service provider or enterprise network) does not also administer or have control over the preferred calling identifier. In such a case the system can provide a further optional capability wherein the right of the caller to offer a Caller ID is authenticated (verified).

It is therefore beneficial to implement such a mechanism in a secure manner, as the ability to employ a different calling-number or calling-name ID should be restricted to properly-authorized and authenticated persons, in order to ensure the quality of this information. Subscribers may be less likely to pay the monthly fee for Caller ID if there is insufficient reliability associated with the displayed Caller ID. Accordingly, preferred embodiments include an authentication mechanism for verifying the calling party information is authentic and/or authorized. Accordingly, an aspect of the present invention provides a method of providing caller identification information by a caller for a call comprising: a) Designating caller identification information (Caller ID) to be conveyed to said called party from a set of more than one possible Caller IDs; and b) conveying said Caller ID to said called party and further comprising authenticating said designated Caller ID prior to said conveying step, wherein said Authenticating step comprises supplying sufficient information to establish the caller's right to convey the designated Caller ID. Such an authentication step is of particular value when the call is originated from a device controlled by a first administrative entity, and the designated Caller ID is controlled by a second administrative entity. In such a case, the authenticating step can include having the second administrative entity confirming the caller's right to use the designated Caller ID.

In a further aspect, the present invention provides a method of providing caller identification information by a caller for a call comprising: Designating caller identification information (Caller ID) to be conveyed to said called party; Determining the administrative entity which can authenticate the designated Caller ID; Authenticating the callers permission to use said Caller ID; and Responsive to said authenticating step, conveying said Caller ID to said called party.

For example a PSTN subscriber loop is under the control of a subscriber's service provider. Thus the telephone number associated with the subscriber is an example of a calling identifier administered by the telephony company. Let us assume a doctor, Susan Smith is a subscriber of a residential number. Assume she wishes to make a call from her home phone, but in her capacity as a surgeon at the local hospital, and desires to convey her hospital identity (e.g., her hospital phone number). The system will need the administrative entity responsible for the hospital phone numbers to authenticate her right to use that number. Note that in this example, the hospital's network will likely belong to a different domain than the telephony company. In a further example, assume she owns her own practice, and in that capacity she is also a subscriber to telephone company Y (which may be different from the service provider of her residential service). In this situation, she is the "owner" of the Dr Smith's practice Caller ID. She would need to authorize telephone company Y to authenticate her use of that Caller ID from outside her practice.

Accordingly a further aspect of the present invention provides a method of providing caller identification information by a caller for a call comprising: a) Designating caller identification information (Caller ID) to be conveyed to a called party from a device administered by a first domain, said Caller ID administered by a second domain; b) Authenticating said Caller ID; and c) Responsive to said authenticating step, conveying said Caller ID to said called party.

In this specification, a domain is a collection of End Systems, Intermediate Systems, and subnetworks operated by a single organization or administrative authority. Thus a domain can include a group of hosts, routers, switches and networks operated and managed by a single organization. The components which make up the domain are assumed to interoperate with a significant degree of mutual trust among themselves, but interoperate with other Administrative Domains in a mutually suspicious manner. Thus an example of a domain is a telephony company's network which forms part of the PSTN. Other examples of domains include a single internet service provider's network or a single enterprise network.

In a further aspect, the present invention provides a call server comprising a controller and machine-readable medium tangibly embodying computer executable instructions for controlling a call server, said computer executable instructions comprising: a) instructions for designating caller identification information (Caller ID) to be conveyed to said called party; b) instructions for determining the administrative entity which can authenticate the designated Caller ID; c) instructions for authentication of the caller's permission to use said Caller ID; and d) instructions for, responsive to said authentication, conveying said Caller ID to said called party.

In a further aspect, the present invention provides a computer program product embodied in a machine-readable medium tangibly embodying computer executable instructions for implementing a Caller ID function on a call server, said computer executable instructions comprising: a) instructions for designating caller identification information (Caller ID) to be conveyed to said called party; b) instructions for determining the administrative entity which can authenticate the designated Caller ID; c) instructions for authentication of the caller's permission to use said Caller ID; and d) instructions for, responsive to said authentication, conveying said Caller ID to said called party.

In a further aspect, the present invention provides a computer program product embodied in a machine-readable medium tangibly embodying computer executable instructions for implementing a Caller ID function on a terminal, said computer executable instructions comprising instructions for: a) receiving an indication that a caller desires to call a called party; b) displaying said a set of Caller ID values to said caller; c) conveying the selected Caller ID as part of the call set up message sent by said terminal. According to an embodiment, said computer executable instructions further instructions for determining the order of a set of Caller ID values to display to said caller based on an estimation of the likelihood of a Caller ID being selected.

Embodiments of the invention are applicable to existing TDM telephony systems as well as to VoIP systems and other systems which offer or could offer calling identification.

Note many voice mail systems can store the Caller ID information in order to easily return a call. Therefore it is beneficial for the appropriate Caller ID information to be conveyed, not just for call disposition purposes (i.e., so the recipient can decide whether to answer), but for call return purposes.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3 is a flow chart illustrating the steps executed by the call server (with input from the user through an appropriate interface) according to an embodiment of the invention.

DETAILED DESCRIPTION

Generally, the present invention provides a system, method, and apparatus for managing the contextual information (e.g., calling-party identification) offered to called parties. This is accomplished by providing a system which allows a calling party to designate the contextual information (Context Info) to be conveyed to the called party. Typically the calling party does this by specifying a value to be used as the calling-party identification; a preferred embodiment will include a default or provisioned selection of alternative identifiers, with the calling party selecting which of multiple values they wish to have sent with the call request. Preferred embodiments include an authentication mechanism for validating the calling party information.

Existing Caller ID systems associate a default identity with the terminal or location. An embodiment of the invention introduces the ability to implicitly associate multiple identities with a terminal or location (e.g. an executive's desk phone could be provisioned to offer as alternatives the executive's phone number, the number for the administrative assistant, and the contact information for the company switchboard) any of which are selectable by the caller. In this case, the service provider or enterprise who administers the numbers or extensions has administrative control over the use of those numbers.

Identities can also be associated with the caller, who as discussed, may serve in several different roles, and will want an Identity (Caller ID) for each role. The caller has access to these identities as well, which are often independent of the Caller IDs associated with a given terminal or location, and can be administered by different domains. However, in order to have the flexibility of allowing any caller to select the Caller ID from a given terminal, it is desirable to have an authentication stage completed. This authentication involves supplying sufficient information to establish the caller's right to the Caller Identification information and can take various forms, including a PIN code on a cell phone, a challenge-response authentication in the case of a SIP registration, or implicit authentication based on physical access to the terminal (to a residence phone, to a device in a private office, to a cellular handset). Again, the service provider or enterprise administering these terminal devices and the caller's account has administrative control over these identities.

A caller may have the calling identification provisioned against the terminal, against the caller's profile, or can enter the desired calling identification at the time the call is being placed. This identification can take the form, without restriction, of a numeric, alphanumeric, graphical, spoken, animated, visual or biometric identification; and can be entered at the terminal or by reference using keypads, biometric devices, and other input-output peripheral equipment.

Figure 1:
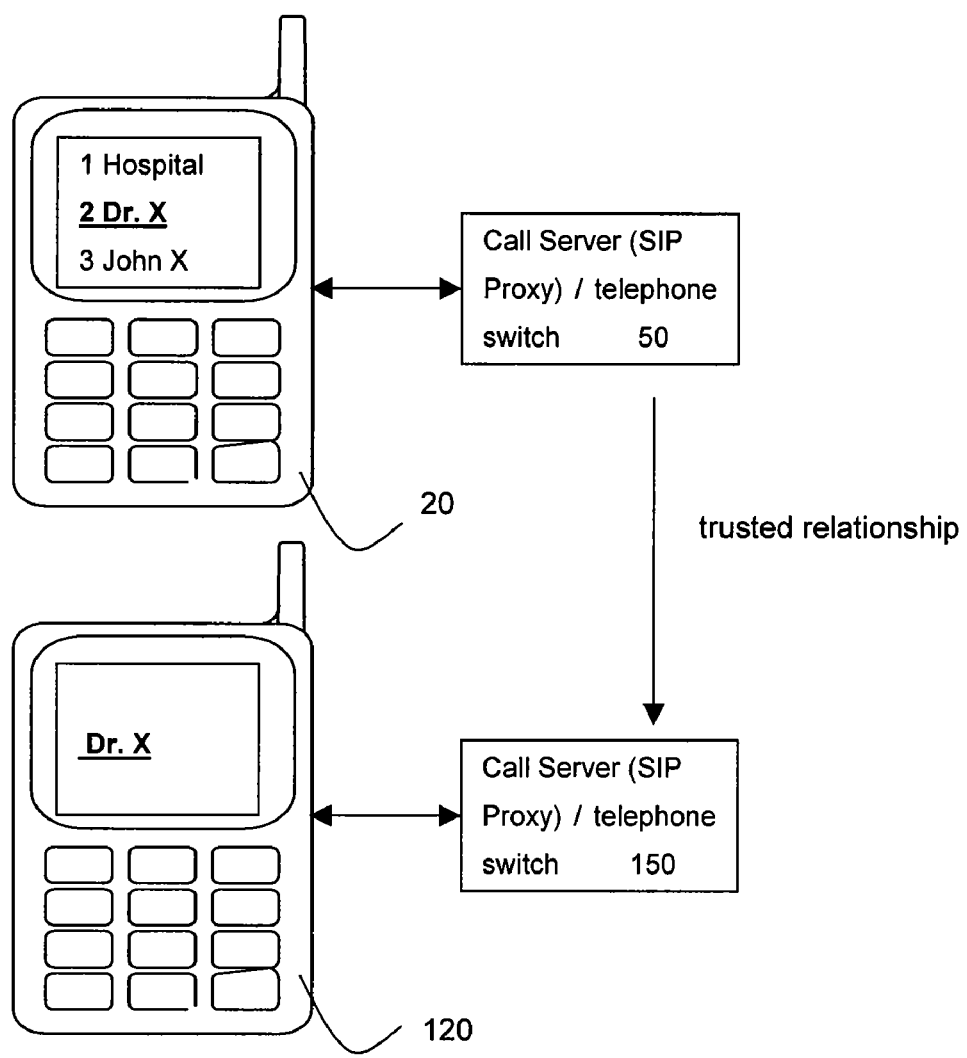
FIG. 1 is a conceptual drawing which illustrates an example, according to an embodiment of the invention, where each party to the call uses a managed communications service.

FIG. 1 illustrates an example, according to an embodiment of the invention, where each party to the call uses a managed communications service (e.g., the PSTN service; or a managed VoIP service). Calling Party 20, which uses a calling service administered by a calling server 50 (which can be a TDM switch or a VoIP call server, or . . . ). The Calling Party calls the Called Party 120, which uses a calling service administered by a calling server 150. Note the calling servers need not be of the same type, or even be administered by the same network. Conversely, both the Called Party 120 and the Calling Party 20 can use the same Calling server. In this case, the entity that has administrative control over the calling-party's service (Call server 50) is responsible for performing the above authentication step. That entity either has or establishes a trust relationship with the call server 150 used by the called party 120. The calling-party's entity submits the selected calling-party identifier as part of the signaling for the call to the called-party's service-provider entity, and it is propagated to the called party's terminal in a manner appropriate to that party's service and technology. Because the called party also has a trust relationship with its own service provider, the trust chain is maintained and the calling-party identification can be considered relatively reliable. The trusted relationship can be established directly between the call servers. This trusted relationship can be intrinsic, or negotiated.

As can be seen, in this example where the calling party is a physician, the calling party is provided with a plurality of previously authorized identities. The Calling party selects the identity appropriate for the context of the call (in this example Dr. X) which is then conveyed to the called party.

Figure 2:
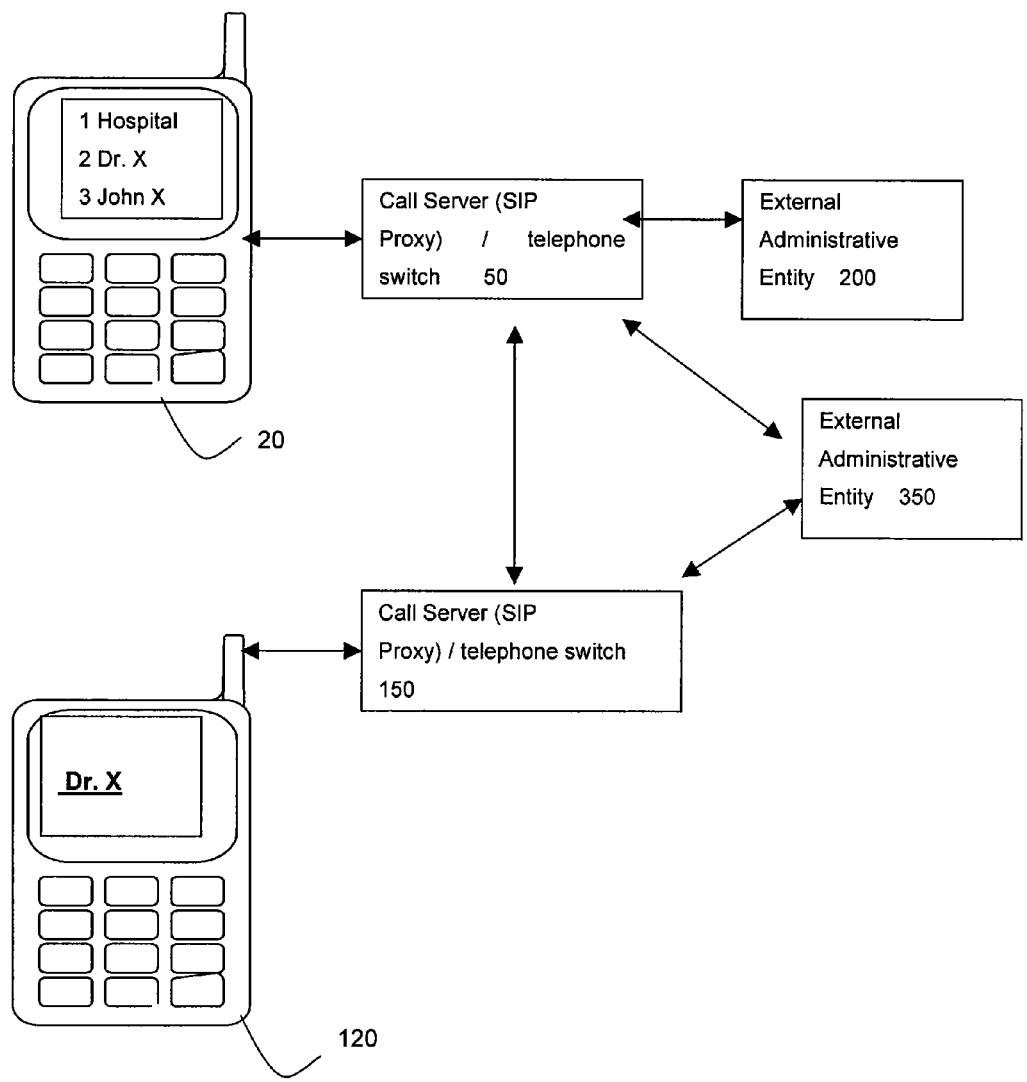
FIG. 2 is a conceptual drawing which illustrates the same example, according to another embodiment of the invention, where external administrative entities are used for authentication purposes.

FIG. 2 illustrates the use of an optional External Administrative Entity 350, which provides authentication to both servers to provide the trusted relationship 300. Such a system can use an externally-visible trusted element for the authentication.

Embodiments of the invention can also allow callers to offer values of calling identification where the administrative control over those identifiers does not reside with the provider or enterprise administering the communications service, but rather with other agencies, firms, or services. An example, without restriction, of such a situation is that of a physician placing a call from their home office, and selecting the calling identification of the hospital to which they have admitting privileges. In this case, the service provider offering the communications service (the physician's home telephone service provider) does not have administrative control over the calling identification selected—this is held by the hospital. A validation mechanism is needed to authorize such use, as will be described in more detail below.

Where the identity selected is not administered by the entity providing the communications service, the communications service contacts the administrative entity associated with the offered calling identifier to establish the caller's authorization to employ that calling identifier. This contact can be made at the time of the call; or ahead of time and a record of that authentication, optionally associated with a mechanism for expiring that authentication, being associated with the caller's profile. The record may indicate that existing authentications are sufficient for use of this identifier; or alternatively, the record may take the form of credentials used in a challenge-response exchange to be conducted with the calling party, or directions on the means, entities, and protocols to be used to perform a dynamic authentication action. The communications service will facilitate the authentication function as directed. Such a scenario is also illustrated in FIG. 2, in which Call Server 50 contacts an appropriate External Administrative Entity 200 which authenticates the selected caller identifier for the calling party 20. Note in this preferred embodiment, neither the CalledParty 120 or its Call Server 150 needs to interact with the External Administrative Entity 200. Here, the Call Server 50 either has or establishes a trust relationship with the called Party's Server 150—and this trust chain is sufficient for the called party to accept that the authentication has been properly conducted. Alternatively, in another preferred embodiment, either with or absent a trust relationship between the call servers, the calling party's call server can forward confirmation of authorization in some form (one example without limitation being an assertion, token, or certificate) which can be independently verified by the called party's call server and/or the called party themselves. Note the FIG. 2 shows both External Administrative Entity 200 and External Administrative Entity 350, for ease of illustration, and to clarify the differences between them. However, it should be noted that one, both, or neither entity can be used, based on the circumstances.

It is possible for either the calling or called party, or both, to perform communications services without a service provider (e.g. using a VoIP client). In such a case, no end-to-end trust chain exists. Where a calling party has no managed service provider to attest on its behalf, the called party can authenticate with the service entity of the called party. This may be done using digital signatures or other form of third-party attestation (e.g. involving a certificate authority) or by other means. The calling party authenticates with the administrative entity that owns the selected identifier, and the calling party will secure an attestation (which can take the form of a digital signature) which can be forwarded with the calling identifier (or be made available in response to a request by the calling-party's administrative entity) to prove legitimacy of use of the calling identifier. The called party's entity (or, where it exists, the called party's service provider call server or proxy) can confirm the legitimacy of the use of the identifier by referring back to the offered certificate or back to the issuing party.

FIG. 3 is a flow chart illustrating the steps executed by the call server (with input from the user) according to an embodiment of the invention. First the calling party elects to place a call for 100 by designating a called party (callee) 410. This can take the form of simply entering a phone number associated with the callee. The calling party then designates a Caller ID, for example by selecting from a Caller ID list. The retrieved list 420 can be provisioned in advance, or it can be based on criteria which can include any or all of the location of the terminal used by the calling party, the time of day, the called party and the calling terminal or by a user ID entered by the calling party. Note that the order the potential Caller IDs presented to the user can differ, based on an estimation of which is the most likely Caller ID to be selected, for example, based on presence information. For example, during a work day, a work related Caller ID may be more likely to be selected than a personal Caller ID, and vice a versa for the weekend. Note that if the subscriber subscribes to "presence" services, than these can be used in determining the order the Caller IDs are presented to the user. For example, if a doctor is in his clinic, and attempts to make a call from his cell phone, the clinic switch board may be presented above the default cell phone Caller ID, in order to make it easier to select it.

The calling party then selects a Caller ID from the list, or alternatively will enter a value 430. The selected Caller ID is optionally verified against policy for the callee, and if rejected refined Caller ID list 450 is provided to the calling party from which to reselect.

If the call server 50 is part of service provider network which charges for the selectable Caller ID feature, then optionally it can confirm the subscription or collect a pay per use service fee 460. Of course this step will not be necessary for an enterprise provider. Optionally, an explicit authorization requirement check is made 470 which may lead to an authentication step 480 to determine that the calling party can use the selected Caller ID according to policy. Note that a user's authentication may need to be established across multiple administrative domains or IT systems. Assuming the authentication is successful 485 (or if no authentication is used) the call is originated using the selected Caller ID 500, and optionally, the designated Caller ID is added to the Caller ID list if it was a newly entered value. If the authentication is not successful at step 485 a policy exception step may be executed 495 that logs the event and alerts the user who may reselect a Caller ID from a list or enter a new value. The called parties can optionally validate the Caller ID tag with an external administrative entity 200 or with the call server 50. Note such authentication may be implicit as in the traditional directory number based on the PSTN physical plan.

Note for step 420 a policy engine can be queried which uses context, policy, and user direction to select the Caller ID to offer for the session. Such a policy engine may be a separate entity or may form part of a call server 50, or may be implemented on a terminal device.

The operation of these functionalities is discussed in further detail later herein. However, those of ordinary skill will recognize that the features of these functionalities can be implemented using processing hardware and software, such as computers or microprocessors and corresponding program and data memories. Such processors can be individual local processors or can be implemented in a central processor. Distributed processing techniques may also be used. Additionally, individual functions can be built in hard wired logic as may be desirable for the system implementation. Thus, the system according to the invention is not limited by the form of computer or processor construction, but can be implemented using any processing technique now known or later developed. Those of ordinary skill will recognize that an call server according to the invention can be implemented in a single processor or single unit or can be implemented in a plurality of units performing portions of the overall call server functions. Thus aspects of the invention can be implemented in a call server, telephony switch, or software for controlling either. Furthermore, portions of the invention can be implemented within software running on the terminal device.

For example, a terminal device can include software, executed on a processor for displaying a set of previously authorized Caller ID values to a caller, and receiving a selection from said caller of the designated Caller ID. Note that the set of previously authorized Caller IDs can be displayed based on an estimation of which is the most likely Caller ID to be selected, based on any combination of context, policy, presence information and user direction. The terminal can then send the designated Caller ID to a call server (via the terminal's service provider), which then determines the administrative entity which can authenticate the designated Caller ID, authenticate the caller's permission to use said Caller ID and then conveys the designated Caller ID to the called party as part of call set up procedures. However, this is but one example. The terminal can be pre-provisioned with a set of multiple Caller IDs, each of which has been previously approved. In which case the authentication step is effectively done in advance.

Embodiments of the invention may be represented as a software product stored on a machine-readable medium (also referred to as a computer-readable medium, a processor-readable medium, or a computer usable medium having a computer readable program code embodied therein). the machine-readable medium may be any type of magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data. Those of ordinary skill in the art will appreciate that other instructions and operations necessary to implement the described invention may also be stored on the machine-readable medium. Software running from the machine readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of providing caller identification information (Caller ID) of a calling party associated with a first device to a called party associated with a second device, the first device and the second device being operationally connectable to a call server, the method comprising, at the call server:
   sending to the first device, for selection at the first device, a set of more than one possible Caller IDs to be displayed on the first device, the set of more than one possible Caller IDs being based on an estimation of the likelihood of a Caller ID being selected;
   receiving from the first device a selected Caller ID selected from the set of more than one possible Caller IDs; and
   conveying the selected Caller ID to the second device.

2. The method as claimed in claim 1 wherein the set of more than one possible Caller IDs represents multiple identities associated with the calling party.

3. The method as claimed in claim 1 wherein the set of more than one possible Caller IDs represents multiple identities associated with the first device.

4. The method as claimed in claim 1 wherein conveying the selected Caller ID to the second device is preceded by authenticating the selected Caller ID, wherein the authenticating comprises receiving authentication information to establish the right of the calling party to use the selected Caller ID.

5. The method as claimed in claim 4 wherein the authentication information is received from an administrative entity which has administrative control over the selected Caller ID.

6. The method as claimed in claim 4 wherein the authentication information is received from an administrative entity which has established trustworthiness to the called party.

7. The method as claimed in claim 4 wherein the first device is controlled by a first administrative entity, and the selected Caller ID is controlled by a second administrative entity.

8. The method as claimed in claim 7 wherein the authenticating comprises the second administrative entity confirming the right of the calling party to use the selected Caller ID.

9. The method as claimed in claim 4 wherein the authentication information comprises an identifier of the first device, which has been pre-approved to use the selected Caller ID.

10. The method as claimed in claim 7 wherein the authentication information is received from a third administrative entity which has been granted the authority to authenticate.

11. The method as claimed in claim 4 wherein the authentication information comprises a user ID and password.

12. The method as claimed in claim 1 wherein the first device is controlled by a first administrative entity, and the selected Caller ID is controlled by a second administrative entity.

13. The method as claimed in claim 1 further comprising authenticating the selected Caller ID prior to the conveying to establish the right of the calling party to use the selected Caller ID.

14. The method of claim 1 wherein the call server includes a SIP proxy.

15. The method of claim 1 wherein the estimation is based on presence information.

16. The method as claimed in claim 1, wherein the set of more than one possible Caller IDs includes only pre-authorized Caller IDs.

17. A method of providing caller identification information (Caller ID) of a calling party associated with a first device to a called party associated with a second device, the first device and the second device being operationally connectable to a call server, the method comprising, at the call server:
   sending to the first device, for selection at the first device, a set of more than one possible Caller IDs to be displayed on the first device, the set of more than one possible Caller IDs being based on an estimation of the likelihood of a Caller ID being selected;
   receiving from the first device a selected Caller ID selected from the set of more than one possible caller IDs, the first device administered by a first domain, the Caller ID administered by a second domain;
   authenticating the selected Caller ID; and
   conveying the selected Caller ID to the second device.

18. The method of claim 17 wherein the estimation is based on presence information.

19. A method of providing caller identification information (Caller ID) of a calling party associated with a first device to a called party associated with a second device, the first device and the second device being operationally connectable to a call server, the method comprising, at the call server:
   sending to the first device, for selection at the first device, a set of more than one possible Caller IDs to be displayed on the first device, the set of more than one possible Caller IDs being based on an estimation of the likelihood of a Caller ID being selected;
   receiving from the first device a selected Caller ID selected from the set of more than one possible caller IDs;

determining an administrative entity which can authenticate the selected Caller ID;
authenticating a permission of the calling party to use the selected Caller ID; and
conveying the selected Caller ID to the second device.

20. The method as claimed in claim 19, wherein the estimation is based on presence information.

21. The method as claimed in claim 19 wherein the determining comprises determining the administrative entity from a plurality of possible administrative entities, based on the selected Caller ID.

22. The method as claimed in claim 16 further comprising charging the calling party a fee.

23. The method of claim 19 wherein the estimation is based on presence information.

24. A call server comprising a controller and machine-readable medium tangibly embodying instructions for execution by a call server to carry out a method of providing caller identification information (Caller ID) of a calling party associated with a first device to a called party associated with a second device, the first device and the second device being operationally connectable to the call server, the method comprising, at the call server:
sending to the first device, for selection at the first device, a set of more than one possible Caller IDs to be displayed on the first device, the set of more than one possible Caller IDs being based on an estimation of the likelihood of a Caller ID being selected;
receiving from the first device a selected Caller ID selected from the more than one possible Caller IDs;
determining an administrative entity which can authenticate the selected Caller ID;
authenticating a permission of the calling party to use the selected Caller ID; and
conveying the selected Caller ID to the second device.

25. The call server of claim 24 wherein the estimation is based on presence information.

26. The call server as claimed in claim 24 wherein the set of more than one possible Caller IDs represents multiple identities associated with the calling party.

27. The call server as claimed in claim 24 wherein the set of more than one possible Caller IDs represents multiple identities associated with the first device.

28. The call server as claimed in claim 24 wherein authenticating includes receiving authentication information from an administrative entity which has administrative control over the selected caller ID.

29. The call server as claimed in claim 28 wherein the authentication information comprises an identifier of the first device, which has been pre-approved to use the selected Caller ID.

30. The call server as claimed in claim 28 wherein the authentication information comprises a user ID and password.

31. The call server as claimed in claim 24 wherein authenticating includes receiving authentication information from an administrative entity which has established trustworthiness to the called party.

32. The call server as claimed in claim 24 wherein the first device is controlled by a first administrative entity, and the selected Caller ID is controlled by a second administrative entity.

33. The call server as claimed in claim 32 wherein authenticating comprises receiving from the second administrative entity a confirmation of the right of the calling party to use the selected Caller ID.

34. The call server as claimed in claim 24 wherein authenticating includes receiving authentication information from an administrative entity which has been granted the authority to authenticate.

35. A computer program product embodied in a machine-readable medium tangibly embodying computer executable instructions for execution by a call server to carry out a method of providing caller identification information (Caller ID) of a calling party associated with a first device to a called party associated with a second device, the first device and the second device being operationally connectable to the call server, the method comprising, at the call server:
sending to the first device, for selection at the first device, a set of more than one possible Caller IDs to be displayed on the first device, the set of more than one possible Caller IDs being based on an estimation of the likelihood of a Caller ID being selected;
receiving from the first device a selected Caller ID selected from the more than one possible Caller IDs;
determining an administrative entity which can authenticate the selected Caller ID;
authenticating a permission of the calling party to use the selected Caller ID; and
conveying the selected Caller ID to the second device.

36. The computer program product of claim 35 wherein the estimation is based on presence information.

37. A computer program product embodied in a machine-readable medium tangibly embodying computer executable instructions for execution by a call server to carry out a method of providing caller identification information (Caller ID) of a calling party associated with a first device to a called party associated with a second device, the first device and the second device being operationally connectable to the call server, the method comprising, at the call server:
a. receiving an indication that the calling party desires to call a called party;
b. sending to the first device, for selection at the first device, a set of more than one possible Caller IDs to be displayed on the first device, the set of more than one possible Caller IDs being based on an estimation of the likelihood of a Caller ID being selected;
c. receiving from the first device, a selected Caller ID, selected from the more than one possible Caller IDs, as part of a call set up message.

38. The computer program product of claim 37 wherein the estimation is based on presence information.

* * * * *

UNITED STATES PATENT AND TRADEMARK OFFICE
CERTIFICATE OF CORRECTION

| | | |
|---|---|---|
| PATENT NO. | : 7,995,727 B1 | |
| APPLICATION NO. | : 11/379595 | |
| DATED | : August 9, 2011 | |
| INVENTOR(S) | : Thomas P. Chmara et al. | |

It is certified that error appears in the above-identified patent and that said Letters Patent is hereby corrected as shown below:

Column 11, line 12, delete "claim 16" and insert therefor -- claim 19 --

Signed and Sealed this
Twenty-seventh Day of September, 2011

David J. Kappos
*Director of the United States Patent and Trademark Office*